US009797313B2

(12) United States Patent
Morenko

(10) Patent No.: US 9,797,313 B2
(45) Date of Patent: Oct. 24, 2017

(54) INTERNAL MANIFOLD WITH FUEL INLET

(71) Applicant: PRATT & WHITNEY CANADA CORP., Longueuil (CA)

(72) Inventor: Oleg Morenko, Oakville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 725 days.

(21) Appl. No.: 14/156,868

(22) Filed: Jan. 16, 2014

(65) Prior Publication Data

US 2015/0198096 A1 Jul. 16, 2015

(51) Int. Cl.
F02C 7/22 (2006.01)
F02C 7/232 (2006.01)
F02C 7/228 (2006.01)

(52) U.S. Cl.
CPC .............. *F02C 7/222* (2013.01); *F02C 7/228* (2013.01); *F02C 7/232* (2013.01); *F05D 2260/231* (2013.01); *F05D 2260/602* (2013.01); *F23D 2209/30* (2013.01); *Y10S 60/904* (2013.01)

(58) Field of Classification Search
CPC .......... F02C 7/222; F02C 7/232; F02C 7/228; F05D 2260/231; F05D 2260/602; Y10S 60/904; F23D 2209/30
USPC .................................................... 60/739, 740
See application file for complete search history.

(56) References Cited

U.S. PATENT DOCUMENTS

| | | | | |
|---|---|---|---|---|
| 5,231,833 A * | 8/1993 | MacLean | ................ | F02C 7/222 60/734 |
| 5,261,240 A * | 11/1993 | Oyler | .................. | F16L 19/0231 285/80 |
| 5,279,112 A * | 1/1994 | Halila | ................ | F02M 37/0017 285/13 |
| 5,771,696 A * | 6/1998 | Hansel | .................... | F23R 3/283 60/739 |
| 6,182,437 B1 * | 2/2001 | Prociw | .................... | F23D 11/36 60/776 |
| 7,305,830 B2 * | 12/2007 | Fish | ........................ | F02C 7/222 285/124.1 |
| 7,320,212 B2 * | 1/2008 | Fish | ........................ | F02C 7/222 60/39.094 |
| 7,370,477 B2 | 5/2008 | Roche et al. | | |
| 7,451,599 B2 * | 11/2008 | Fish | ........................ | F02C 7/222 60/739 |
| 7,533,531 B2 * | 5/2009 | Prociw | .................... | F02C 7/222 60/739 |
| 7,559,201 B2 | 7/2009 | Prociw et al. | | |

(Continued)

*Primary Examiner* — Christopher Besler
*Assistant Examiner* — Bayan Salone
(74) *Attorney, Agent, or Firm* — Norton Rose Fulbright Canada LLP

(57) ABSTRACT

An internal fuel manifold assembly includes a fuel manifold ring having at least one fuel conveying passage in fluid flow communication with at least one inlet passage defined through an inlet member. The inlet member is connected to the manifold ring proximate its first end and connected proximate its second end to at least one transfer tube. The inlet member includes a drainage passage for collecting possible leaked fuel from an annulus, defined between the inlet member and a heat shield surrounding the inlet member and spaced apart therefrom. Any leaked fuel is discharged out of the inlet member at an exit of the fuel passage on an end surface of the inlet member proximate the second end thereof.

9 Claims, 5 Drawing Sheets

(56) References Cited

U.S. PATENT DOCUMENTS

| | | | |
|---|---|---|---|
| 7,607,226 B2* | 10/2009 | Patel | B23B 1/00 29/889.2 |
| 7,654,088 B2* | 2/2010 | Shafique | F02C 7/222 60/739 |
| 7,703,286 B2* | 4/2010 | Morenko | F02C 3/145 60/734 |
| 7,743,612 B2 | 6/2010 | Morenko | |
| 7,765,808 B2* | 8/2010 | Fish | F02C 7/222 60/734 |
| 7,854,120 B2* | 12/2010 | Olver | B23H 9/00 60/734 |
| 7,926,286 B2* | 4/2011 | Morenko | F02C 3/145 60/739 |
| 7,942,002 B2* | 5/2011 | Fish | F02C 7/222 60/734 |
| 8,037,690 B2* | 10/2011 | Morenko | F02C 7/222 60/39.094 |
| 8,079,220 B2* | 12/2011 | Haggerty | F02C 7/222 60/739 |
| 8,096,130 B2 | 1/2012 | Morenko | |
| 8,171,738 B2 | 5/2012 | Fish et al. | |
| 8,353,166 B2* | 1/2013 | Morenko | F02C 3/14 60/739 |
| 8,596,959 B2* | 12/2013 | Durocher | F01D 9/065 415/110 |
| 8,978,383 B2* | 3/2015 | Patel | F02C 7/222 60/734 |
| 9,068,508 B2* | 6/2015 | Fish | F02C 7/222 60/739 |
| 9,228,747 B2* | 1/2016 | Prociw | F23R 3/286 |
| 2005/0160738 A1* | 7/2005 | Fish | F02C 7/222 60/776 |
| 2010/0050645 A1* | 3/2010 | Haggerty | F02C 7/222 60/739 |
| 2010/0281881 A1* | 11/2010 | Morenko | F02C 3/14 60/796 |
| 2013/0247574 A1 | 9/2013 | Patel et al. | |

* cited by examiner

INTERNAL MANIFOLD WITH FUEL INLET

TECHNICAL FIELD

The described subject matter relates generally to gas turbine engines and, more particularly, to an internal manifold for such engines.

BACKGROUND

Gas turbine engine internal fuel manifolds are typically located inside the engine case adjacent the engine combustor, and thus reside in an extremely hot environment. As is typical with other hardware mounted inside a gas turbine engine, complex connections are required to allow for thermal expansion and to accommodate mismatches in thermal expansion which may exist between components made of different materials and/or which are exposed to different environmental temperatures. Complex systems are more difficult to make and assemble, and tend to add weight and cost. Furthermore, an internal fuel manifold is typically configured as a manifold ring having a fuel inlet tube attached thereto. The attachment between the fuel inlet and the manifold ring may be made in any number of ways including welding, brazing and the like. However, the high temperature and high vibration to which the fuel manifold is exposed within the gas turbine engine, can cause weakening and/or cracking at the joint formed between the fuel manifold ring and its fuel inlet. Therefore, fuel drainage passages may be conventionally introduced using P3 bleed air to dump leaked fuel into a bypass duct in the case of manifold joint failure. That P3 bleed air is constantly wasted, increases fuel inlet temperature and promotes fuel coking.

Accordingly, there is a need to provide improvements to internal fuel manifolds.

SUMMARY

There is provided an internal fuel manifold assembly for a gas turbine engine comprising: a fuel manifold ring defining at least one fuel conveying passage therethrough in fluid flow communication with a plurality of fuel injection nozzles adapted for spraying fuel into a combustor of the gas turbine engine, the manifold ring having an inlet port in fluid flow communication with the at least one fuel conveying passage; an elongate inlet member defining at least one inlet passage extending therethrough between first and second ends of the inlet member, the first end being mounted to the inlet port of the manifold ring for communication therewith and the inlet member extending from the manifold ring, the at least one inlet passage being in fluid flow communication with the at least one fuel conveying passage, the inlet member defining a fuel drainage passage, the fuel drainage passage having an entry on a peripheral surface of the inlet member and an exit on an end surface of the inlet member; a heat shield surrounding the inlet member and being attached to the manifold ring proximate a first end of the heat shield and allowing the inlet member to extend outwardly from a second end of the heat shield, the heat shield and the inlet member being spaced apart so as to define an annulus therebetween, the annulus having substantially closed ends and being in fluid flow communication with the fuel drainage passage of the inlet member; and at least one transfer tube having first and second ends, the first end of the transfer tube being connected to the inlet member proximate the second end thereof and being in fluid flow communication with the at least one inlet passage.

There is also provided a combustor assembly in a gas turbine engine comprising: a gas generator casing; an annular combustor supported within the gas generator casing, and a fuel injection system, the fuel injection system including: a fuel manifold ring disposed within the casing and adjacent to the combustor, the fuel manifold ring defining at least one fuel conveying passage therein in fluid flow communication with a plurality of fuel injection nozzles adapted for spraying fuel into the combustor, the manifold ring having an inlet port in fluid flow communication with the at least one fuel conveying passage, an elongate inlet member defining at least one inlet passage extending therethrough between first and second ends of the inlet member, the first end being mounted to the inlet port of the manifold ring for communication therewith and the inlet member extending from the manifold ring, the at least one inlet passage being in fluid flow communication with the at least one fuel conveying passage, the inlet member defining a fuel drainage passage, the fuel drainage passage having an entry on a peripheral surface of the inlet member and an exit on an end surface of the second end of the inlet member, a heat shield surrounding the inlet member and being attached to the manifold ring proximate a first end of the heat shield, the heat shield extending through and being supported at an opening of the casing, the inlet member extending through the heat shield and away from a second end of the heat shield, the heat shield and the inlet member being spaced apart so as to define an annulus therebetween, the annulus having substantially closed ends and being in fluid flow communication with the fuel drainage passage of the inlet member; and at least one transfer tube having first and second ends, the first end of the transfer tube being connected to the inlet member proximate the second end thereof, the transfer tube being in fluid flow communication with the at least one inlet passage of the inlet member.

BRIEF DESCRIPTION OF THE DRAWINGS

Reference is now made to the accompanying figures in which.

DETAILED DESCRIPTION

Figure 1:
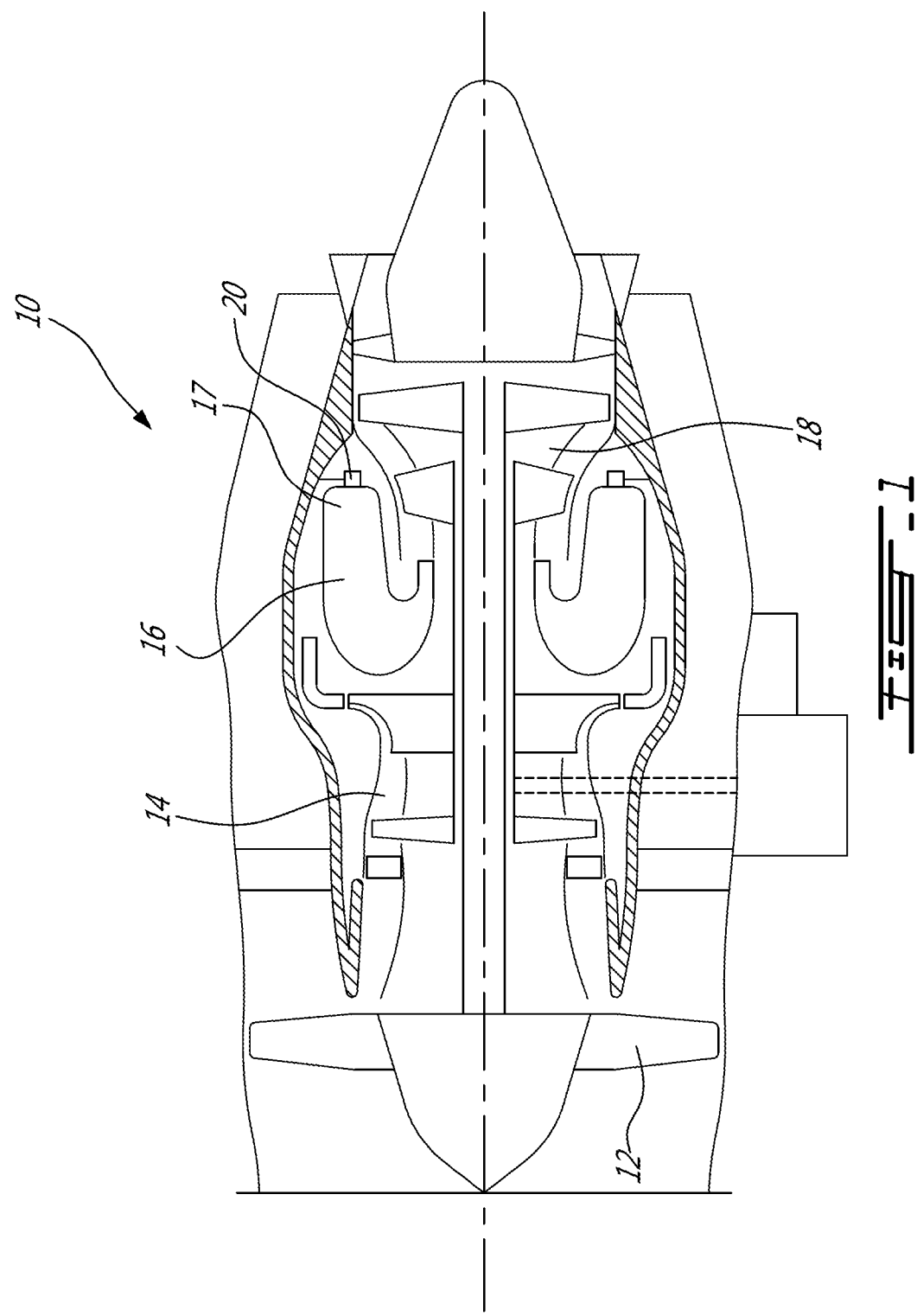
FIG. 1 is a schematic side cross-sectional view of a gas turbine engine.

FIG. 1 illustrates a gas turbine engine 10 generally including in serial flow communication: a fan 12 through which ambient air is propelled, a compressor section 14 for pressurizing the ambient air, a combustion section 16 in which the compressed air is mixed with fuel atomized into a combustor 17 by a fuel injection system including a fuel injection assembly 20 which is connected in fluid flow communication with a fuel source (not shown), the mixture being subsequently ignited for generating hot combustion gases before passing through a turbine section 18 for extracting energy from the combustion gases. The fan 12, compressor section 14, combustor 17 and turbine 18 are all positioned concentrically about a common central longitudinal axis of the gas turbine engine 10.

Figure 2:
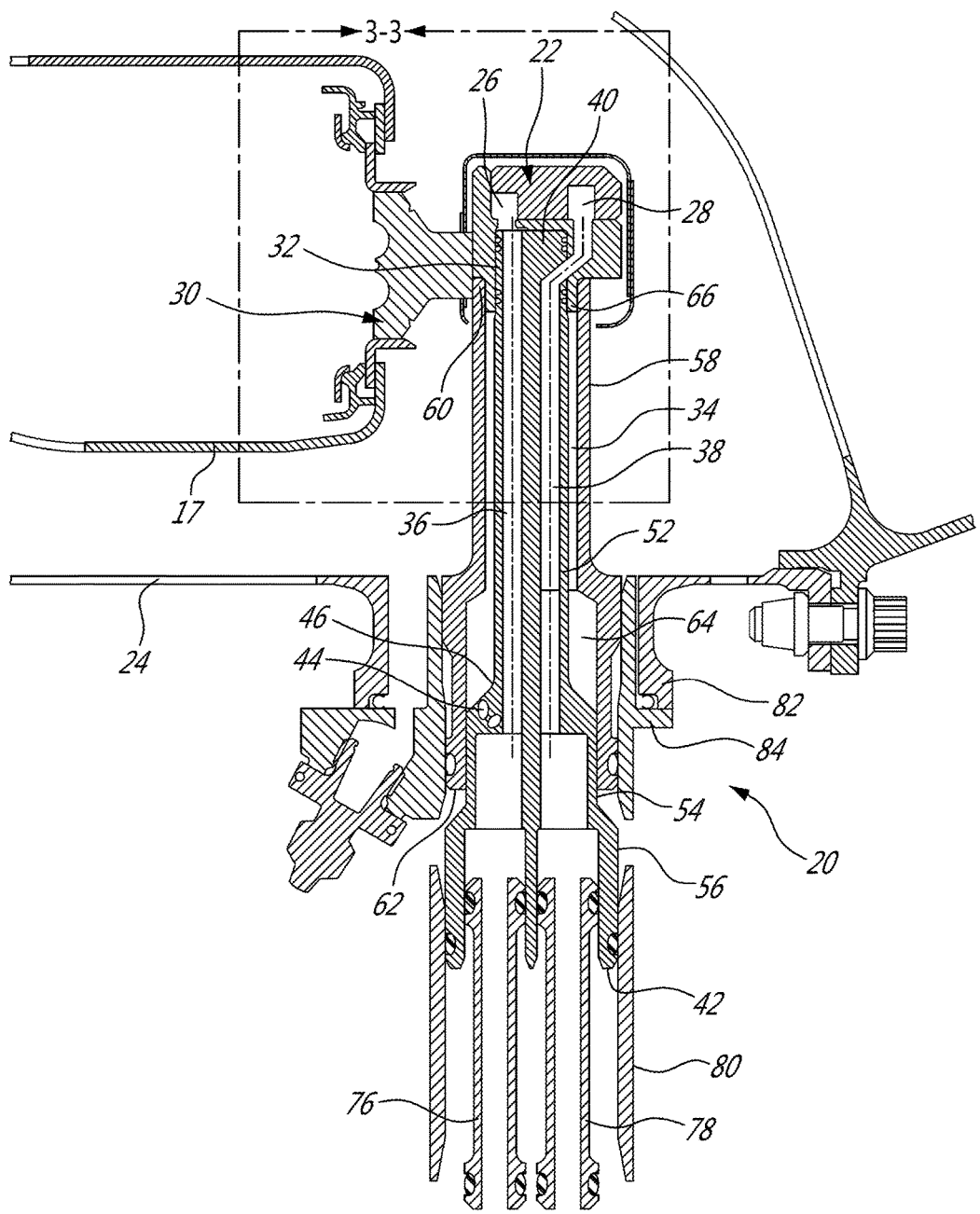
FIG. 2 is a cross-sectional view of a combustor assembly including a fuel injection system used in the engine of FIG. 1, including an internal fuel manifold ring.
Figure 4:
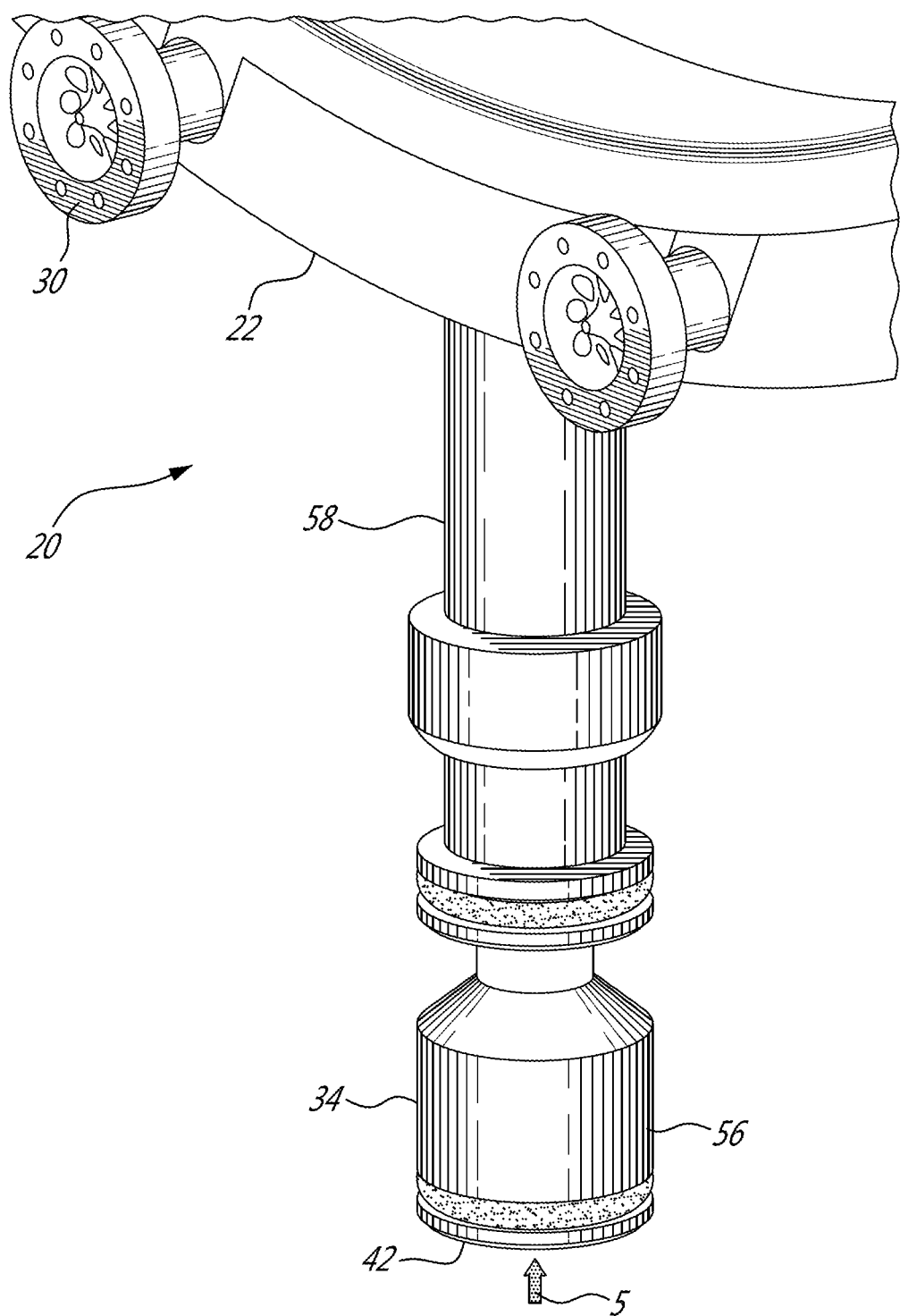
FIG. 4 is a perspective view of a portion of the fuel inlet manifold ring with the fuel inlet member.
Figure 5:
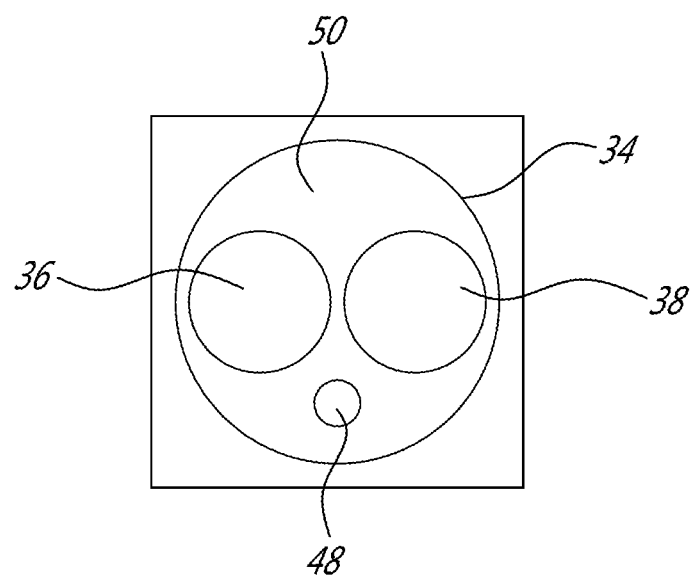
FIG. 5 is a bottom plan view of the fuel inlet member, as indicated by arrow 5 in FIG. 4, showing an exit of a fuel drainage passage through the fuel inlet member.

Referring to FIGS. 2 and 4, the fuel injection assembly 20 according to one embodiment, may include an internal fuel manifold 22 (or simply "fuel manifold ring") disposed within a gas generator casing 24 which surrounds and supports the combustor 17. The combustor 17 may be of an annular type positioned about the central longitudinal axis of the gas turbine engine 10 (see FIG. 1). The fuel manifold ring 22 may be positioned adjacent the combustor 17 and defines at least one fuel conveying passage. According to the embodiment illustrated in FIG. 2, two respective fuel conveying passages 26, 28 extend circumferentially within the fuel manifold ring 22 and are in fluid flow communication with a plurality of fuel injection nozzles 30 which may be positioned on the fuel manifold ring 22 and adapted for spraying fuel into the combustor 17. The fuel manifold ring 22 may have an inlet port 32 in fluid flow communication with the at least one fuel conveying passage, for example fuel conveying passages 26, 28.

Referring to FIGS. 2-5, the fuel injection assembly 20 may further include an elongate inlet member 34 defining at least one inlet passage. According to this embodiment two respective inlet passages 36, 38 may extend through the inlet member 34 between opposed first and second ends 40, 42 of the inlet member 34. The first end 40 may be inserted into the inlet port 32 of the fuel manifold ring 22 and the elongate inlet member 34 may extend radially outwardly away from the fuel manifold ring 22 (see FIG. 4). The inlet passages 36, 38 are in fluid flow communication with the respective fuel conveying passages 26, 28. The inlet member 34 may define a fuel drainage passage 44 having an entry (not numbered) on a peripheral surface 46 thereof and having an exit 48 (see FIG. 5) on an end surface 50 of the second end 42 of the inlet member 34.

In one embodiment the inlet member 34 may be cylindrical and may include first, second and third sections 52, 54 and 56. The first section 52 may define the first end 40 of the inlet member 34 and the third section 56 may define the second end 42 of the inlet member 34. The first section 52 may have a diameter smaller than a diameter of the second section 54 and the diameter of the second section 54 may be smaller than a diameter of the third section 56. Transition sections (not numbered) may be disposed between the adjacent sections 52, 54, 56 and may have varying diameters increasing from the smaller diameter to the larger diameter of the respective adjacent sections 52, 54, 56. For example, such a transition section between the first and second sections 52, 54 may define the peripheral surface 46 of the inlet member 34 in a truncated conical profile. The entry of the drainage passage 44 may be thus located in this transition section on the surface 46. The truncated conical profile of the surface 46 at the transition section makes it easier to drill the entrance to the fuel drainage passage 44 into the inlet member 34 and is advantageous for collecting leaked fuel into the fuel drainage passage 44.

A heat shield 58 may be provided to surround the inlet member 34 in order to prevent the inlet member 34 from being directly exposed to the high temperature environment within the casing 24. The heat shield 58 may be cylindrical and may be attached to the fuel manifold ring 22 at a first end 60 of the heat shield. The heat shield 58 may extend through and may be supported at an opening of the gas generator casing 24, which will be further described hereinafter with details. The inlet member 34 may extend through the heat shield 58 and outwardly away from a second end 62 of the heat shield 58. The heat shield 58 and the fuel inlet member 34 in combination define an annulus 64 therebetween. The annulus 64 which, for example substantially surrounds the first section 52 of the inlet member 34, may be substantially closed at opposed ends thereof. The annulus 64 may be in fluid flow communication with the fuel drainage passage 44 of the inlet member 34.

The fuel manifold ring 22 may be made with two or more machined metal ring components to form a rigid internal fuel manifold, which for example, is described in applicant's U.S. Pat. No. 8,096,130, entitled FUEL CONVEYING MEMBER FOR A GAS TURBINE ENGINE, granted to Morenko on Jan. 17, 2012, which is incorporated herein by reference.

The fuel manifold ring 22 may include a projecting annular boss 66 which defines an opening in the fuel manifold ring 22 to allow the first end 40 of the inlet member 34 to extend into the inlet port 32 of the fuel manifold ring 22. The projecting annular boss 66 may be inserted into the first end 60 of the heat shield 58, functioning as a connector for connection with the heat shield 58 and the inlet member 34. The projecting annular boss 66 may further function as an annular spacer disposed between the heat shield 58 and the first section 52 of the inlet member 34 to provide a space forming the annulus 64.

The inlet member 34 may be affixed to the machined fuel manifold ring 22 by brazing joints disposed within the inlet port 32 of the fuel manifold ring 22 and surrounding the inlet member 34 to provide both a joint function and a seal function, resulting in eliminating the need to use regular O-ring seals in this high temperature environment. According to this embodiment, the inlet passage 36 may have a first exit 68 on an end surface (not numbered) at the first end 40 of the inlet member 34 and the inlet passage 38 may have a second exit 70 on a peripheral surface of the inlet member 34 adjacent the first end 40 of the inlet member 34. The first and second exits 68 and 70 are in fluid flow communication with the respective first and second fuel conveying passages 26, 28. Accordingly, there is a first brazing joint 72 located between the first end 40 of the inlet member 34 and the second exit 70 of the inlet passage 38. There is a second brazing joint 74 located between the second exit 70 of the inlet passage 38 and the opening defined by the projecting annular boss 66. In such a brazing joint arrangement, the first and second exits 68, 70 are sealed in fluid flow isolation one from the other.

The manifold ring 22 may be provided with a heat protection ring (not numbered) which may be made of sheet metal and may be configured to substantially surround the manifold ring 22.

At least one transfer tube may be provided for connecting the inlet member 34 to a fuel supply system (not shown) of the gas turbine engine 10. According to this embodiment, first and second transfer tubes 76, 78 may be attached to the second end 42 of the inlet member 34. First ends (not numbered) of the transfer tubes 76, 78 may be connected ire fluid flow communication with the respective inlet passages 36, 38 and second ends (not numbered) of the transfer tubes 76, 78 are adapted to be connected with appropriate components (not shown) of the fuel supply system of the engine. The transfer tube connection between the inlet member 34 and other components of the fuel supply system in the engine, provides tolerance for mismatch between the inlet member and the connected other components of the fuel supply system.

Figure 3:
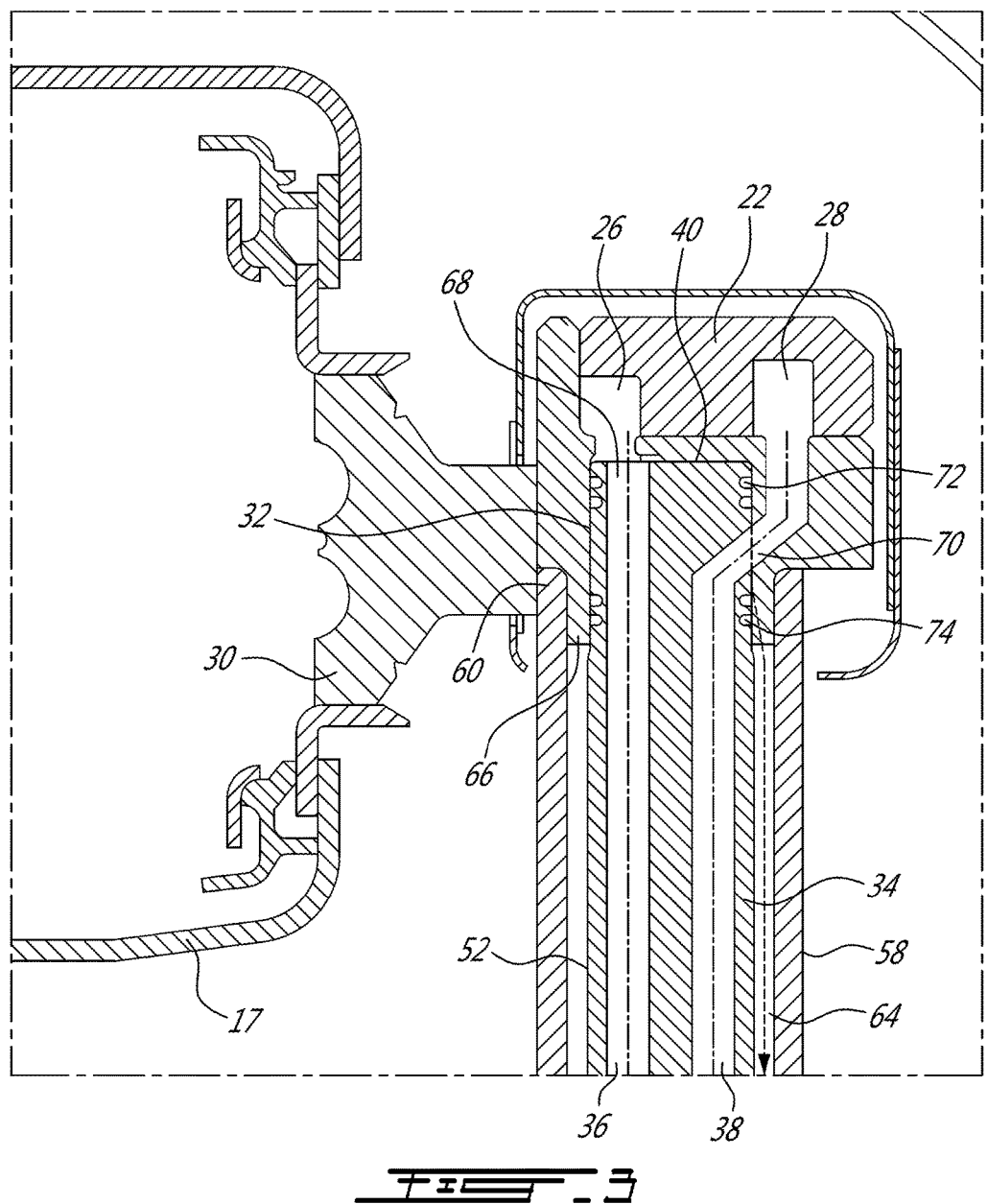
FIG. 3 is an enlarged partial area of FIG. 2, showing attachment of an inlet member to the internal fuel manifold ring.

In the case of brazing joints 72, 74 failure, fuel leaked from the interface between the inlet member 34 and the inlet port 32 of the manifold ring 22, may be collected in and guided by the annulus 64 between the first section 52 of the inlet member 34 and the heat shield 58, as shown by the broken line arrow in FIG. 3. The leaked fuel collected in the annulus 64 may be directed under gravity and/or by pressure, into the drainage passage 44 to pass through the second and third sections 54, 56 of the inlet member 34, and to be discharged at the second end 42 of the inlet member 34 from the exit 48 of the drainage passage 44 (see FIG. 5). The leaked fuel discharged from the exit 48 of the drainage passage 44 may be directed to a desired location in the engine 10 through drainage pipelines (not shown) which may be connected to the exit 48 of the drainage passage 44.

Alternatively, the fuel injection system 20 may further include a drainage tube 80 attached to the second end 42 of the inlet member 34. For example, the second end 42 of the inlet member 34 may be inserted into one end of the drainage tube 80, and the transfer tubes 76, 78 which are connected to the second end 42 of the inlet member 34 may extend through the drainage tube 80. The leaked fuel discharged from the exit 48 of the drainage passage 44 may be collected in and guided by the drainage tube 80 to be delivered to another component (not shown) connected to the other end of the drainage tube 80.

According to one embodiment, the gas generator casing 24 may include a mounting boss 82 defining that opening which is described above for the second end 62 of the heat shield 58 to extend therethrough and to be supported therein. A hollow adapter 84 may be seated in the opening defined by the mounting boss 82. The heat shield 58 may be supported in the hollow adapter 84 to allow the inlet member 34 to extend through the hollow adapter 84 such that the second end 42 and the third section 56 of the inlet member is positioned out of the casing 24 for connection with the respective transfer tubes 76, 78 and drainage tube 80.

The above description is meant to be exemplary only, and one skilled in the art will recognize that changes may be made to the embodiments described without departing from the scope of the described subject matter. Modifications which fall within the scope of the described subject matter will be apparent to those skilled in the art, in light of a review of this disclosure, and such modifications are intended to fall within the appended claims.

The invention claimed is:

1. An internal fuel manifold assembly for a gas turbine engine comprising:
   a fuel manifold ring defining at least one fuel conveying passage therethrough in fluid flow communication with a plurality of fuel injection nozzles adapted for spraying fuel into a combustor of the gas turbine engine, the manifold ring having an inlet port in fluid flow communication with the at least one fuel conveying passage;
   an elongate inlet member defining at least one inlet passage extending therethrough between first and second ends of the inlet member, the first end being mounted to the inlet port of the manifold ring for communication therewith and the inlet member extending from the manifold ring, the at least one inlet passage being in fluid flow communication with the at least one fuel conveying passage, the inlet member defining a fuel drainage passage, the fuel drainage passage having an entry on a peripheral surface of the inlet member and an exit on an end surface of the second end of the inlet member;
   a heat shield surrounding the inlet member and being attached to the manifold ring proximate a first end of the heat shield and allowing the inlet member to extend outwardly from a second end of the heat shield, the heat shield and the inlet member being spaced apart so as to define an annulus therebetween, the annulus having substantially closed ends and being in fluid flow communication with the fuel drainage passage of the inlet member; and
   at least one transfer tube having first and second ends, the first end of the transfer tube being connected to the inlet member proximate the second end thereof and being in fluid flow communication with the at least one inlet passage.

2. The internal fuel manifold assembly as defined in claim 1 wherein the inlet member is cylindrical and comprises first, second and transition sections, the first section defining the first end of the inlet member and having a diameter smaller than a diameter of the second section, the transition section disposed between the first and second sections having a varying diameter increasing from the first section to the second section.

3. The internal fuel manifold assembly as defined in claim 1 wherein the entry of the drainage passage is defined in the transition section of the inlet member.

4. The internal fuel manifold assembly as defined in claim 1 wherein the manifold ring comprises a projecting annular boss, the annular boss defining an opening to allow the first end of the inlet member to extend into the inlet port of the manifold ring, the annular boss being received in the first end of the heat shield.

5. The internal fuel manifold assembly as defined in claim 1 further comprising a brazing joint disposed within the inlet port of the manifold ring and surrounding the inlet member to provide a seal between the manifold ring and the inlet member.

6. The internal fuel manifold assembly as defined in claim 1 further comprising a drainage tube attached to the second end of the inlet member and surrounding the at least one transfer tube to define a space between the drainage tube and the at least one transfer tube, said space being in fluid flow communication with the exit of the drainage passage in the second end of the inlet member.

7. The internal fuel manifold assembly as defined in claim 1 wherein the manifold ring comprises first and second fuel conveying passages in fluid flow communication with respective first and second inlet passages extending through the inlet member, the first and second inlet passages being in fluid flow communication with respective first and second transfer tubes connected to the second end of the inlet member.

8. The internal fuel manifold assembly as defined in claim 7 wherein the first inlet passage comprises a first exit on an end surface at the first end of the inlet member and wherein the second inlet passage comprises a second exit on a peripheral surface adjacent the first end of the inlet member.

9. The internal fuel manifold assembly as defined in claim 8 further comprising brazing joints disposed within the inlet port of the manifold ring and surrounding the inlet member to provide seals between the manifold ring and the inlet member, a first brazing joint being located between the first end and the second exit of the second inlet passage and a second brazing joint being located between the second exit of the second inlet passage and an opening of the inlet port for receiving insertion of the inlet member.

* * * * *